United States Patent [19]

Negi et al.

[11] 4,127,768

[45] Nov. 28, 1978

[54] DATA PROCESSING SYSTEM SELF-TEST ENABLING TECHNIQUE

[75] Inventors: Virendra S. Negi, Pepperell; Ming T. Miu, Chelmsford, both of Mass.

[73] Assignee: Honeywell Information Systems Inc., Waltham, Mass.

[21] Appl. No.: 756,298

[22] Filed: Jan. 3, 1977

[51] Int. Cl.$^2$ ............................................. G06F 11/04
[52] U.S. Cl. .................................. 235/304.1; 364/200
[58] Field of Search ................. 235/153 AK, 153 AC, 235/304.1; 364/200 MS File, 900 MS File

[56] References Cited

U.S. PATENT DOCUMENTS

| | | | |
|---|---|---|---|
| 3,343,141 | 9/1967 | Hackl | 340/172.5 |
| 3,889,109 | 6/1975 | Blessin | 235/153 AK |
| 3,940,744 | 2/1976 | Mock et al. | 340/172.5 |
| 3,988,579 | 10/1976 | Bottard et al. | 235/153 AK |

*Primary Examiner*—Jerry Smith
*Attorney, Agent, or Firm*—John S. Solakian; Nicholas Prasinos; Ronald T. Reiling

[57] ABSTRACT

Diagnostic testing of a central processor is provided in conjunction with a memory coupled with the processor without any requirement for an input device such as a tape or card reader. Local storage of a test program is provided in the processor which, under the control of a local control store, enables the transfer of the test program to the memory for execution. The central processor may thus be given an initial test to insure a basic performance level.

8 Claims, 4 Drawing Figures

4,127,768

DATA PROCESSING SYSTEM SELF-TEST ENABLING TECHNIQUE

RELATED APPLICATIONS

The following U.S. patent applications and issued patent are incorporated herein by reference:

(1)

Patent application Ser. No. 674,698
Filed — Apr. 7, 1976
Title — WORD, BYTE AND BIT INDEXED ADDRESSING IN A DATA PROCESSING SYSTEM
Inventors — William E. Woods et al.
Now U.S. Pat. No. 4,079,451

(2)

Patent application Ser. No. 674,517
Filed — Apr. 7, 1976
Title — ADDRESS FORMATION IN A MICROPROGRAMMED DATA PROCESSING SYSTEM
Inventors — Philip E. Stanley et al.
Now U.S. Pat. No. 4,047,247

(3)

U.S. Pat. No. 3,993,981
Issued — Nov. 23, 1976
Title — ARCHITECTURE FOR A COMMON BUS COUPLED IN A DATA PROCESSING SYSTEM
Inventors — Frank V. Cassarino et al.

BACKGROUND OF THE INVENTION

The present invention generally relates to data processing systems and more particularly to self-test mechanisms included in such systems.

As data processing systems become more and more complex, the need for maintainability features in such systems are much more evident and, in fact, are necessary to assure a satisfactory performance level. Typically, a data processing system will be tested under computer program control which program is provided by an input device such as a card reader or tape reader and which has the effect of placing such computer test program in the system's main memory so as to exercise or test the data processor upon command. In some cases, it is impractical and sometimes nearly impossible to load such test programs and have them executed in the system because of what may be the basic errors in the system which would not enable such testing. Further, it is sometimes impractical, and in some cases not desirable, to require that the system include an input device in order to enable the testing of for example the central processor. That is, during factory check-out of the central processor, an input device is not always available and accordingly it is highly desirable to have a self-test mechanism in the system which would provide some assurance as to the performance level of such processor.

It is accordingly a primary object of the present invention to provide a central processing system, including a central processor and memory in which a self-test mechanism is included in the central processor itself, without the need for any input devices coupled with such system.

SUMMARY OF THE INVENTION

The above stated object and other objects are achieved according to the present invention by providing in a data processing system a machine implemented process for enabling the self-test of a central processor included in the system when coupled with a main memory in the system wherein the process comprises the method steps of providing a base address to a test program stored in a local memory of the processor and providing a word address to the first word in such test program. Further steps are provided for addressing a word location in a control store in such processor, the control store coupled to control the operation of the processor and a further step for determining that the contents of the word location addressed in the control store indicates that the local memory is to be addressed. Further, method steps of addressing a local memory with the base address and the word address and providing a memory address to a word location in the main memory and further transferring the contents of the word location addressed in the local memory to the word location indicated by the memory address and repeating such sequential steps of addressing, providing and transferring until the test program is stored in the main memory are provided, following which the step of executing the test program is provided to determine the performance level of the processor.

BRIEF DESCRIPTION OF THE DRAWINGS

The above and other objects of the present invention are achieved in illustrative embodiment as described with respect to the figures in which.

DETAILED DESCRIPTION OF THE PREFERRED EMBODIMENT

Figure 1:
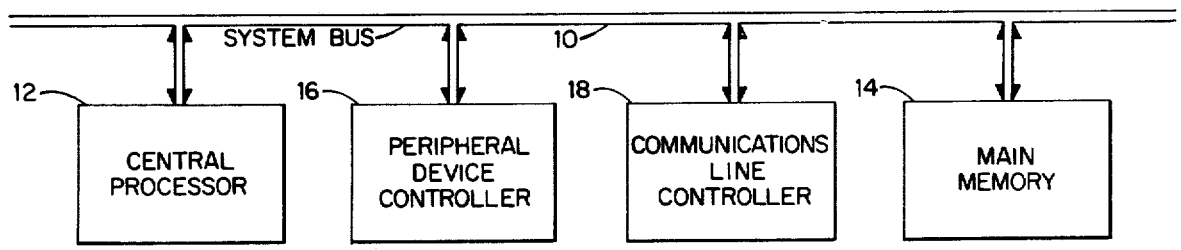
FIG. 1 illustrates the environment of the present invention.

The self-test enabling technique of the present invention is embodied in that environment as shown in FIG. 1. More particularly, the self-test enabling technique is incorporated in the central processor 12 coupled with a main memory 14 by means of the system bus 10. Although the peripheral device controller 16 and the communications line controller 18 may be coupled in the system as finally configured, such controllers are not required in order to execute the self-test enabling technique of the present invention. Such technique basically includes the means by which a test program may be stored in a local memory in the central processor 12 and loaded therefrom into the main memory 14 for execution in a manner so as to test certain basic facilities of the central processor 12 and insure a basic performance level. Input devices such as a peripheral device controller are not required to place the test program in the main memory 14 and, accordingly, the self-test enabling technique of the present invention may be utilized for initially testing the central processor or in fact even after the system is fully configured to provide a test of the processor without disturbing the other facilities in the system. The means by which the self-test enabling technique is employed also provides the means by which so-called key in loader programs, or bootstrap programs, are provided so as to enable the loading of a further program from an input device such as a card reader, a disk or paper tape input device, wherein these further programs are configured based upon the device utilized.

Figure 2:
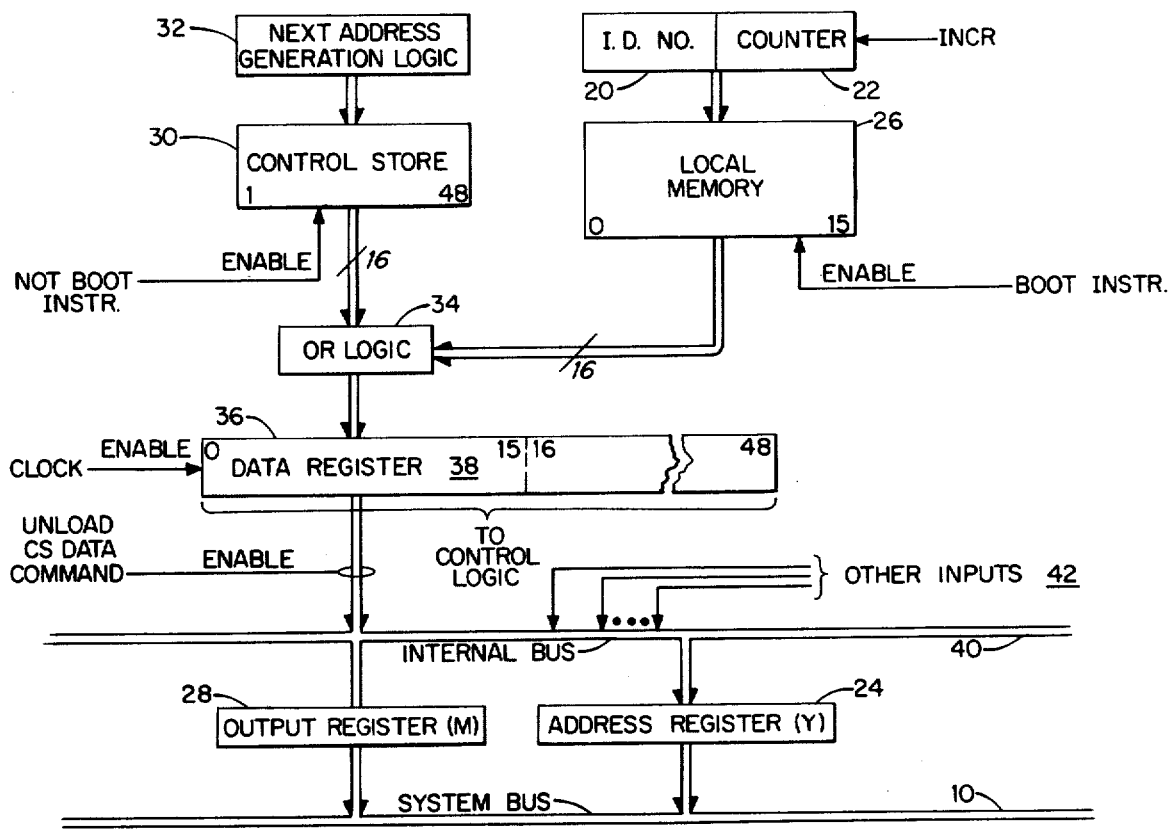
FIG. 2 illustrates the apparatus included in the present invention.
Figure 3:
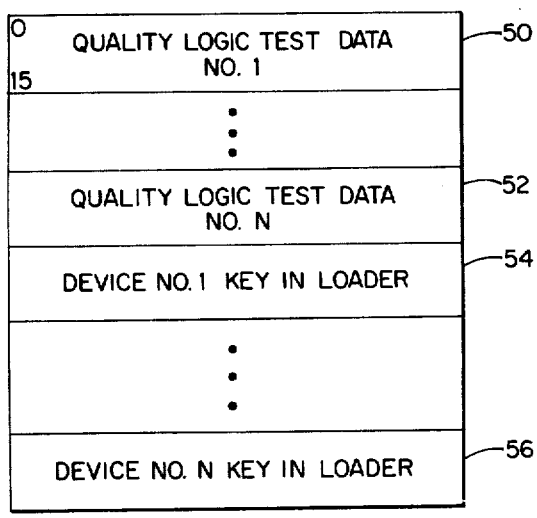
FIG. 3 illustrates the data format of the local memory of the present invention.

Now referring to FIG. 2, the apparatus utilized in the central processor 12 for enabling the execution of the test program is shown. Such apparatus includes a local memory 26 which includes the test program or so-called quality logic test data which is to be executed in order to assure a predetermined performance level of the central processor 12. The format of data stored in local memory 26 is shown in FIG. 3. The test program is stored for example in a first segment 50. By way of example, such test program includes 16 word locations. In addition, other quality logic test data may be provided so as to include in the Nth such data or test program in segment 52 of local memory 26. Further, for the different types of devices which require programs in the main memory 14 in order to operate such devices, the key in loader or bootstrap programs are included in segments 54 for the first such loader, and segment 56 for the Nth such loader, there being a different loader for each different type of device.

By way of illustration, each of such segments may include 16 word locations, each word location having by way of example 16 bits. In order to address the local memory 26 there is provided an Identification (ID) number in register 20 and a value in counter 22 which is capable of being incremented by means of control logic coupled with control store 30. The ID number in register 20 provides the base address of the segment in the local memory 26 which is to be addressed. The counter 22 is coupled to be incremented to address the various word locations in the addressed segment of memory 26. Accordingly, counter 22 is initially preset to indicate a zero value thereby addressing the first word location in the addressed segment.

The control store 30 includes a plurality of microinstructions or so-called firmware commands which include a word which by way of example is 48 bits wide, which bits are grouped fields so as to enable the operation of various elements in the central processor 12. Like the local memory 26, one field of control store 30 is also 16 bits wide and provides information which may be transferred to memory 14. The control store 30 is addressed by means of a next address generation logic 32 which is coupled with the central processor 12 elements so as to enable the addressing of the proper firmware word in control store 30. The next address provided by logic 32 in addition to being controlled by the various elements in the processor 12 is also controlled by the presently addressed firmware word in control store 30. The manner in which control store 30 functions together with the next address generation logic 32 is described in U.S. patent application Ser. Nos. 674,698 and 674,517, filed on Apr. 7, 1976.

Either the local memory 26 or the control store 30 is enabled so as to provide the 16 bits of data to OR logic 34 and further into the control store register 36 which includes a 16 bit data register 38. The control store register 36 is 48 bits wide whereas the data register 38 is 16 bits wide. Either the memory 26 or the control store 30 may be enabled, the memory 26 being enabled by a so-called master clear signal which may be generated by the user at the central processor's console or when power is first turned on in the system. In addition, such enabling boot instruction may be provided under computer program control or by means of the control store 30. The control store 30 is enabled when such enabling boot instruction is not enabled.

The data received in register 36 is coupled to control logic as described in the above indicated pending applications. Data is not enabled into such register 36 until in fact a system clock generates a pulse to so load the data via the output of OR logic 34. With respect to data register 38 which is included in register 36, the contents thereof are provided to an output register 28 and thereafter on the system bus 10 in response to a control store 30 data command. Further, the address to which the data is to be transferred is placed in register 24 which is also coupled with the system bus 10. The manner in which data from register 28, as well as the address in register 24, is provided onto the system bus 10 is shown in detail in the aforementioned pending United States Patent Applications. The registers 28 and 24 receive the data and addresses respectively by means of an internal bus 40 which in addition to receiving the contents of data register 38 is also coupled to receive other inputs 42 as described in the aforementioned Patent Applications. The contents of the data register 38 are not provided to the internal bus 40 until a control store unload command is provided as indicated above.

The local memory 26 may either be a programmable memory or may be a read only memory in which the quality logic test data or test programs are fixed as are the key in loader programs. Upon command such as in response to master clear or power on commands, the contents of the local memory 26, i.e., the quality logic test data as identified, will be addressed by means of the control store 30. Typically, unless otherwise indicated, the first quality logic data segment 50 in memory 26 will be addressed. The base address thereof is provided by the ID number register 20 which may receive its contents by means of the control store 30. As previously indicated the counter 22 is initially set equal to the value of zero. Accordingly the first word location in segment 50 will be addressed and provided to data register 38 and finally to the system bus 10 via output register 28 so as to be stored in a location in main memory 14 as indicated by address register 24. During such process, counter 22 will then be implemented so as to address the next word in segment 50 and the process will be repeated until all words in segment 50 are transferred to memory 14. As previously indicated, the test program need not be limited to 16 words and in fact may be less than 16 words in length. However, it has been found that 16 words of test data gives an indication of performance level indicative of the basic operability of the central processor 12.

Figure 4:
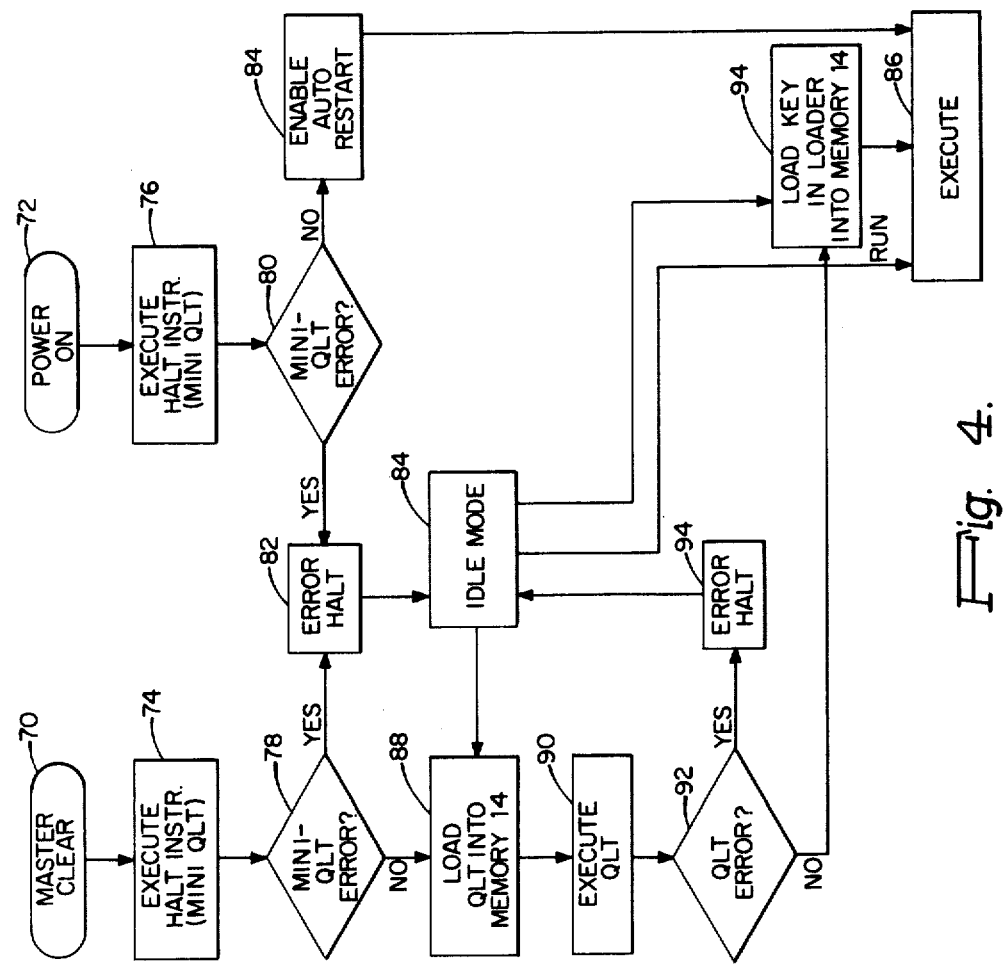

Now referring to FIG. 4, the manner in which the system self-test technique of the present invention is enabled is shown. Such self-test quality logic test (QLT) is enabled in response to either a master clear as indicated by block 70 or a power on as indicated by block 72. Each of these conditions is coupled to execute a so-called mini quality logic test by means of a so-called halt instruction as indicated in blocks 74 and 76. The halt instruction by way of illustration operates to for example clear the output register 28 and may for example operate to make a request from memory thereby providing an initial check of the interface logic with the system bus 10, such interface logic being the subject of U.S. Pat. No. 3,993,981, issued on Nov. 23, 1976. If there is a mini QLT error as indicated by the Yes answer of decision blocks 78 or 80, then an error halt condition as indicated by block 82 is entered from which a so-called idle mode as indicated by block 84 is entered. From the idle mode, the operator receives an indication of such error and may control the operation thereof. If there is no mini QLT error as indicated by block 80 in response to the power on condition, then the system is automatically restarted as indicated by block 84 and such restart mechanism may be executed by means of a restart program in main memory 14. In the alternative, the power on indication may have enabled the addressing of a quality logic test in local memory 26 of central processor 12 as will be shown for the case of the master clear condition.

Thus, where there is no error indicated on the mini QLT, block 88 will be entered by which the quality logic test data in for example segment 50 of memory 26 will be loaded into memory 14. Block 88 may also be entered from the idle mode under operator control. The loading of the QLT from memory 14 is shown in more detail in FIG. 5 to be discussed hereinafter. Following the loading of the quality logic test data into memory 14, it is executed as indicated in block 90 in response to which a determination is made as to whether there is a QLT error as indicated in block 92. If there is no QLT error then by way of example, block 94 may be entered by which the identified key in loader in local memory 26 may be loaded into memory 14 and executed. Block 94 may also be entered from the idle mode under operator control. If there is a QLT error, then as was the case for the mini QLT error, an error halt condition is indicated as indicated by block 94 following which the idle mode is again entered. Thus in response to the auto restart as indicated in block 84 such auto restart may be executed in block 86 or as indicated, the key in loader may be executed or under operator control any other operation may be executed under a so-called run mode.

Figure 5:
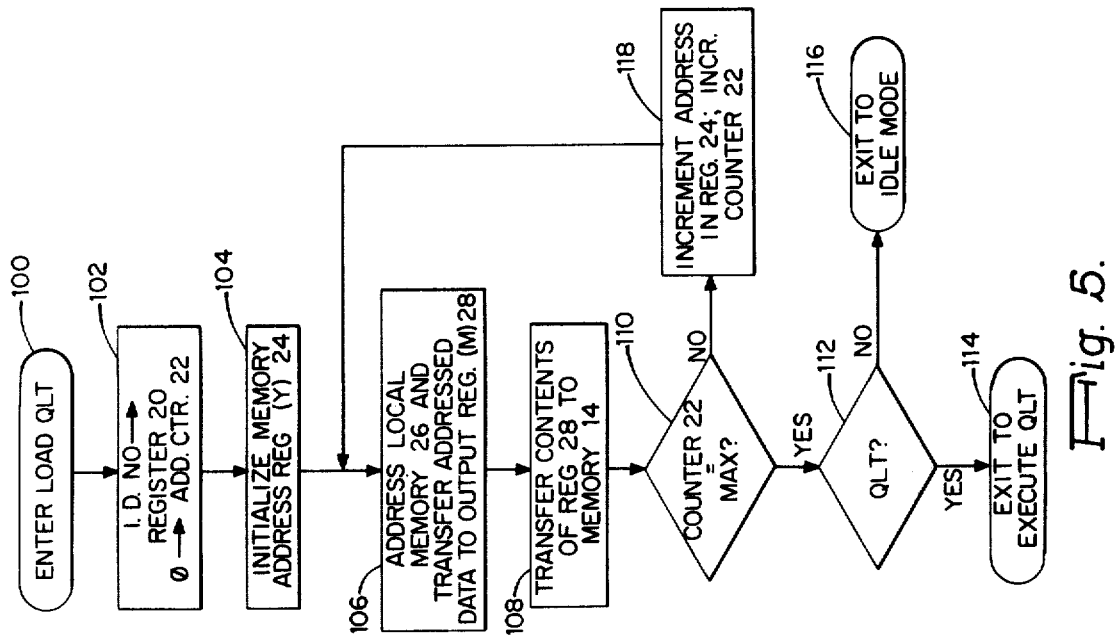
FIGS. 4 and 5 illustrate a flow diagram of the present invention.

As shown in FIG. 5, the enter load QLT function commences as indicated in block 100 by which as indicated in block 102, the ID number is loaded into register 20 and a value of zero is loaded into an address counter 22. Following this, the initial memory address is loaded into register 24 in response to which as indicated in block 106, the local memory 26 is addressed and the data therein transferred to the output register 28. The contents of register 28 are then transferred to memory 14 as indicated in block 108. If counter 22 is a maximum value as determined in block 110, then the question is asked as to whether or not this was a QLT test and if it was as indicated by the answer from block 112, then as indicated by block 114, block 90 is entered by which the QLT is executed. If the answer to block 112 was No, then there would be an exit to the idle mode as indicated by block 116. On the other hand, if block 110 indicated a No answer, such that the counter 22 was not a maximum value, block 118 would be entered by which the address in output register 24 would be incremented and the counter 22 would also be incremented. Following this, block 118 exits so as to repeat the operation of blocks 106, 108 and 110 until the counter 22 indicates a maximum value thereby indicating that the quality logic test data has been fully loaded into memory 14 so as to enable the execution thereof.

Thus it has been seen that a technique has been provided by which a central processor may provide its own self-test mechanism for execution by a main memory without need for input devices so as to ensure a basic operation or performance level of the central processor. Further, it has been seen that such technique may also provide means by which various other data may be loaded into the main memory so as to enable the loading of computer programs required in association with various peripheral devices.

Having described the invention, what is claimed as new and novel and for which it is desired to secure Letters Patent is:

1. In a data processing system, a machine implemented process for enabling the self-test of a central processor included in the system when coupled with a main memory in the system, said central processor including a local memory for storing a plurality of test programs, said process comprising the method steps of:
   A. providing a first base address to one of said test programs stored in said local memory of said processor, said first base address being one of a plurality of base addresses, each of said base addresses used to address a different one of said test programs;
   B. providing a word address to the first word in said test program for which a said base address is provided by said step of providing;
   C. addressing a word location in a control store in said processor, said control store coupled to control the operation of said processor;
   D. determining that the contents of said word location addressed in said control store indicates that said local memory is to be addressed;
   E. addressing said local memory with said first base address and said word address;
   F. providing, independent of said step of addressing said local memory, a memory address to a word location in said main memory;
   G. transferring the contents of the word location addressed in said local memory to the word location indicated by said memory address;
   H. changing the value of the address of said word location in said local memory each time said step of transferring occurs;
   I. changing the value of the memory address of the word location in said main memory each time said step of transferring occurs;
   J. repeating said sequential steps of addressing, providing, transferring, changing and changing until said one of said test programs is stored in said main memory; and
   K. executing said one of said test programs to determine the performance level of said processor.

2. A process as in claim 1 wherein said step of repeating further comprises the steps of:
   A. determining whether each of the word locations in said local memory which is used to store said one of said test programs, have been addressed;
   B. entering said step of executing if each of said word locations used for storing said one of said test programs have been addressed;
   C. updating the addressing of both said local memory and said main memory if each of said word locations used for storing said one of said test programs have not been addressed; and
   D. repeating said steps of determining, entering and updating until all of said word locations used for storing said one of said test programs have been addressed.

3. A process as in claim 2 wherein said step of addressing said local memory with said word address is provided by means of counting means.

4. A process as in claim 3 wherein said step of determining whether each of the word locations used for storing said one of said test programs have been addressed includes the step of determining whether said counting means indicates a predetermined value.

5. A process as in claim 1 further comprising the step of initializing said processor and wherein said process commences in response to said step of initializing.

6. A process as in claim 1 further comprising the steps of:
   A. providing a second base address to another one of said test programs stored in said local memory;
   B. addressing with said second base address said another one of said test programs stored in said local memory;
   C. transferring said another one of said test programs to said main memory; and
   D. executing said another one of said test programs to determine yet a further performance level of said processor.

7. A data processing system including apparatus for enabling the self-test of a central processor included in the system when coupled with a main memory in the system, said central processor including a local memory for storing a plurality of test programs, said apparatus comprising:
   A. first means for providing a first base address to one of said test programs stored in said local memory of said processor, said first base address being one of a plurality of base addresses, each of said base addresses used to address a different one of said test programs;
   B. second means for providing a word address to the first word in said one of said test programs for which a said base address is provided by said first means for providing;
   C. means for addressing a word location in a control store in said processor, said control store coupled to control the operation of said processor;
   D. means for determining that the contents of said word location addressed in said control store indicates that said local memory is to be addressed;
   E. means for addressing said local memory with said first base address and said word address;
   F. means for providing a memory address to a word location in said main memory;
   G. means for transferring the contents of the word location addressed in said local memory to the word location indicated by said memory address;
   H. means for determining whether each of the word locations in said local memory which is used to store said one of said test programs, have been addressed;
   I. means for updating the addressing of both said local memory and said main memory if each of said word locations used for storing said one of said test programs have not been addressed;
   J. means for enabling said means for addressing, providing, transferring, determining and updating until said one of said test programs is stored in said main memory; and
   K. means for executing said one of said test programs to determine the performance level of said processor.

8. Apparatus as in claim 7 wherein said means for addressing said local memory includes means for counting and wherein said means for determining includes means for determining whether said means for counting indicates a predetermined value.

* * * * *